United States Patent
Regier et al.

(10) Patent No.: US 7,747,555 B2
(45) Date of Patent: Jun. 29, 2010

(54) SYSTEM AND METHOD FOR RETRIEVING AND INTELLIGENTLY GROUPING DEFINITIONS FOUND IN A REPOSITORY OF DOCUMENTS

(76) Inventors: Jeffrey Regier, 1136 Channing Ave., Palo Alto, CA (US) 94301; Uri Avissar, 19701 Country Club Dr. #5-508, Aventura, FL (US) 33180

( * ) Notice: Subject to any disclaimer, the term of this patent is extended or adjusted under 35 U.S.C. 154(b) by 691 days.

(21) Appl. No.: 11/711,227

(22) Filed: Feb. 27, 2007

(65) Prior Publication Data
US 2007/0282780 A1 Dec. 6, 2007

Related U.S. Application Data

(60) Provisional application No. 60/809,994, filed on Jun. 1, 2006.

(51) Int. Cl.
*G06F 17/00* (2006.01)
*G06N 7/00* (2006.01)
*G06N 7/08* (2006.01)

(52) U.S. Cl. ...................................... 706/59
(58) Field of Classification Search .................. 706/59
See application file for complete search history.

(56) References Cited

U.S. PATENT DOCUMENTS

| | | | |
|---|---|---|---|
| 6,173,253 B1 * | 1/2001 | Abe et al. | 704/10 |
| 6,223,059 B1 * | 4/2001 | Haestrup | 455/566 |
| 6,374,275 B2 * | 4/2002 | Wasilewski | 715/259 |
| 6,542,170 B1 * | 4/2003 | Williams et al. | 715/816 |
| 6,636,848 B1 * | 10/2003 | Aridor et al. | 707/3 |
| 6,826,553 B1 * | 11/2004 | DaCosta et al. | 707/1 |
| 7,155,683 B1 * | 12/2006 | Williams | 715/816 |
| 7,617,232 B2 * | 11/2009 | Gabbert et al. | 707/102 |

OTHER PUBLICATIONS

An intelligent electronic English-Japanese dictionary system can disambiguate the senses of prepositions appearing in a sentence just as language experts do Ohtsuka, Y.; Yamaguchi, H.; Yamamoto, S.; Sugie, N.; Systems, Man, and Cybernetics, 1999 IEEE International Conference on vol. 5 pp. 820-823.*
Compression scheme for faster and secure data transmission over networks, Shajeemohan, B.S.; Govindan, V.K.; Mobile Business, 2005. ICMB 2005. International Conference on Digital Object Identifier: 10.1109/ICMB.2005.29 Publication Year: 2005, pp. 678-681.*

* cited by examiner

*Primary Examiner*—Michael B Holmes
(74) *Attorney, Agent, or Firm*—Scott D. Wofsy; Edwards Angell Palmer & Dodge LLP

(57) ABSTRACT

A system and method for retrieving and intelligently grouping definitions with common semantic meaning is disclosed. In response to a user's textual query for the definition of a term or phrase, a set of documents is retrieved from a repository of structured documents. The retrieved documents are labeled with a prediction score based upon predetermined glossary characteristics of the documents. In order to determine whether the retrieved documents are likely to be definitions, features commonly found in definitions are identified. The identified features are classified with numeric values and weighed using a support vector regression algorithm. Definitions that fail to meet a predetermined threshold score are discarded, and those that exceed a predetermined threshold score are labeled and stored in the local database.

33 Claims, 13 Drawing Sheets

SYSTEM AND METHOD FOR RETRIEVING AND INTELLIGENTLY GROUPING DEFINITIONS FOUND IN A REPOSITORY OF DOCUMENTS

CROSS-REFERENCE TO RELATED APPLICATIONS

The subject application claims the benefit of priority from U.S. Provisional Application Ser. No. 60/809,994, filed Jun. 1, 2006, the disclosure of which is incorporated herein by reference in its entirety.

BACKGROUND OF THE INVENTION

1. Field of the Invention

The subject invention is directed to a computer-based system and method for retrieving and intelligently grouping definitions with common semantic meanings found in a repository of documents, such as web pages, without human intervention.

2. Background of the Related Art

Natural language processing (NLP) is within the field of artificial intelligence and linguistics. NLP systems respond to human language input and convert it into more formal representations for processing by computer programs, thus facilitating interaction between humans and computers. NLP is used for information retrieval, text critiquing, question answering, summarization, gaming, translation, and with search engines. The limitations of NLP are knowing what a word or phrase stands for, and knowing how to link those concepts together in a meaningful way.

The present invention overcomes the limitations of NLP by providing a system and method for identifying and retrieving definitions found in a repository of structured documents, based on glossary characteristics; employing an algorithm for finding similarity between terms, as well as similarity between senses of terms; and grouping and presenting definitions and related terms in a meaningful way to a user.

SUMMARY OF THE INVENTION

The subject invention is directed to a method for retrieving and intelligently grouping definitions with common semantic meaning that are found in a repository of structured documents. A set of documents is retrieved from a repository of structured documents. The retrieved documents are labeled with a prediction score based upon predetermined glossary characteristics of the documents. If the labeled documents meet a threshold level based upon the prediction score, then the labeled documents are stored in a local database.

In order to determine whether the retrieved documents are likely to be definitions, the documents are converted into hypertext mark-up language (HTML) and inspected according to various criteria as described herein below. This inspection involves the identification of features that are commonly found in definitions. The identified features are classified with numeric values and weighed using a support vector regression algorithm. Definitions that fail to meet a predetermined threshold score are discarded, and those that exceed a predetermined threshold score are stored in the local database.

Another aspect of the invention involves defining acronyms found in retrieved documents. Parenthetical text in retrieved documents is identified and the parenthetical text is compared to the first letters of the preceding words for equivalents. Where the first letters of the preceding words are equivalent to the parenthetical text, the parenthetical text is defined with the preceding words.

Another aspect of the invention involves grouping definitions with common semantic meaning. Duplicate definitions are removed upon a determination that the common portions of two definitions have substantially the same string length. In addition, a vector of real values is determined for each definition, for use in grouping definitions with common semantic meanings, and subsequently for ranking each definition in relation to the others in its cluster. Each definition is assigned one vector of real value based on a weighting of stems of a term. The weighing calculation is based on a comparison of the number of occurrences of a stem in a definition for a term with the number of occurrences of the stem in all stored definitions. The comparison is adjusted to dampen the influence of rare stems.

The definitions are ranked according to the distance from the centroid of the cluster. Outlier definitions are suppressed. The grouping process is repeated for the set of each term's definitions stored. In another embodiment of the invention, related clusters of definitions are identified. A similarity metric is computed to identify the related clusters, which involves identifying co-occurrences of a term found in grouped definitions. Glossary characteristics are iteratively learned in accordance with an expanding volume of labeled and predicted documents in the local database.

The subject invention is also directed to a system for retrieving and intelligently grouping definitions. The system receives a query from a user for a definition, and in turn, retrieves a set of documents from a repository of structured documents in response to the query. The system labels the retrieved documents based upon glossary characteristics of the documents and according to a prediction of whether the labeled documents are in fact definitions. The system stores labeled documents which meet a threshold level in a local database.

The system labels documents after converting the documents into HTML and inspecting the HTML documents according to predetermined criteria, such as (i) whether an insufficient proportion of English words are present in the converted documents; and (ii) whether the HTML in the converted documents is complex. The system then predicts whether the labeled documents are likely definitions. This prediction is a score based on the identification of features that are commonly found in definitions. The system discards definitions that fail to meet a predetermined threshold. The system stores definitions that exceed the predetermined threshold score in the local database.

The system further screens the labeled and stored documents using supplementary criteria including: (i) whether there is an absence of extracted definitions; (ii) whether there is an excess of extracted definitions; and (iii) whether there are terms or definitions extracted which fail to meet a minimum length. Features in the prospective definitions are classified with numeric values and weighed using a support vector regression algorithm.

In another aspect of the invention, the system extracts acronyms found in retrieved documents. The system expands the acronyms based on the comparison of parenthetical text to the first letters of the preceding words for equivalents; and then defining the parenthetical text with the preceding words, where the first letters of the preceding words are equivalent.

In another aspect of the invention, the system identifies text in the format of: An "x" is a "y." The system then defines the term "x" with the definition "y." In yet another aspect of the invention, the system groups definitions with common semantic meanings. To group definitions, the system first eliminates duplicate definitions; and then creates a definition vector formation to rank definitions. The definitions are clustered based on the rank of definitions.

To create a definition vector formation includes a means for assigning one vector of real value to each definition. To assign a real value to each definition, terms are converted into stems. The system then discards stems with less than three characters; stems that consist of stop words; stems that are equivalent to the definitional query; and stems that appear in only one definition. The system calculates the weight of stems based on the number of occurrences of a stem in a definition for a term compared with the number of occurrences of the stem in all stored definitions. This dampens the influence of rare stems. Then, the definitions are ranked according to a distance of the definition from the centroid of a cluster, and outlier definitions are suppressed based on vector ranking.

In another embodiment of the invention, the system computes a similarity metric to identify related terms by identifying co-occurrences of a term found in grouped definitions. In still another aspect of the invention, the system iteratively learns glossary characteristics in accordance with an expanding volume of labeled and predicted documents in the database.

These and other features of the subject invention will become more readily apparent to those having ordinary skill in the art from the following detailed description of the invention taken in conjunction with the drawings described herein below.

BRIEF DESCRIPTION OF THE DRAWINGS

So that those skilled in the art will readily understand how to make and use the subject invention without undue experimentation, preferred embodiments thereof will be described in detail herein below with reference to certain figures, wherein.

DETAILED DESCRIPTION OF THE PREFERRED EMBODIMENTS

Figure 1:
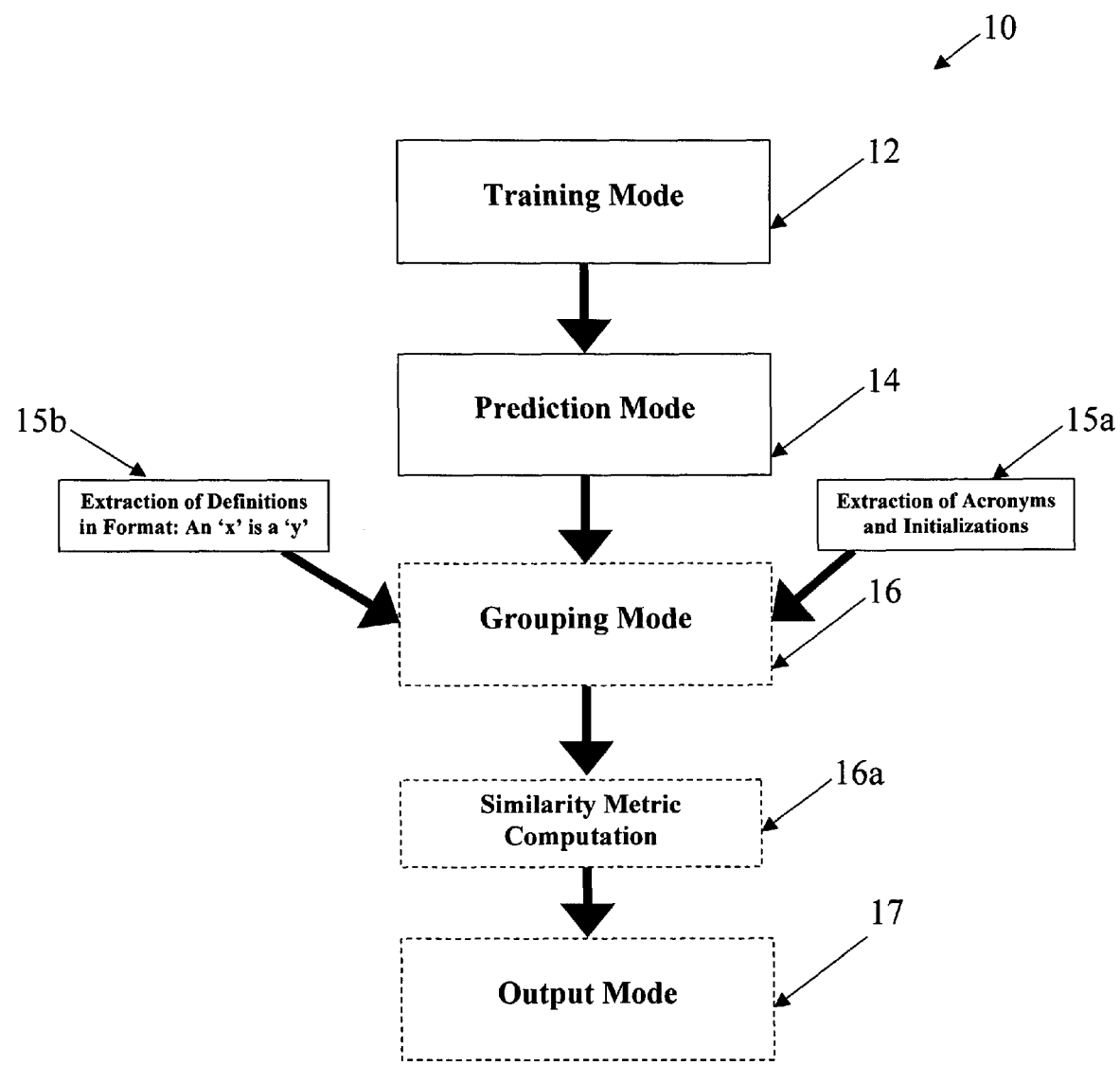
FIG. 1 is a representation of the runtime process flow of the method of the subject invention, which includes a training mode; a prediction mode; a mode for extraction of acronyms and initializations, a mode for extraction of definitions in the format: An 'x' is a 'y'; an optional grouping mode; an optional mode for computing a similarity metric; and an optional output mode.

Referring now to the drawings wherein like reference numeral identify similar aspects or characteristics of the system and method the subject invention, there is illustrated in FIG. 1 a representation of the runtime process flow of the method of the subject invention, which is designated generally by reference numeral 10, and which includes a training mode 12; a prediction mode 14; a mode 15a for extraction of acronyms and initializations, a mode 15b for extraction of definitions in the format: An 'x' is a 'y'; an optional grouping mode 16; a optional mode 16a for computing a similarity metric; and an optional output mode 17.

In brief, the training mode 12 is adapted and configured to train the system with respect to retrieval and extraction of definitional data, the prediction mode 14 is adapted and configured to further extract and classify preferred definitional data, and the optional grouping mode 16 is adapted and configured to logically order the preferred definitional data. In a particular embodiment of the invention, the system includes an optional output mode 17, which distributes grouped definitions to end users.

Figure 2:
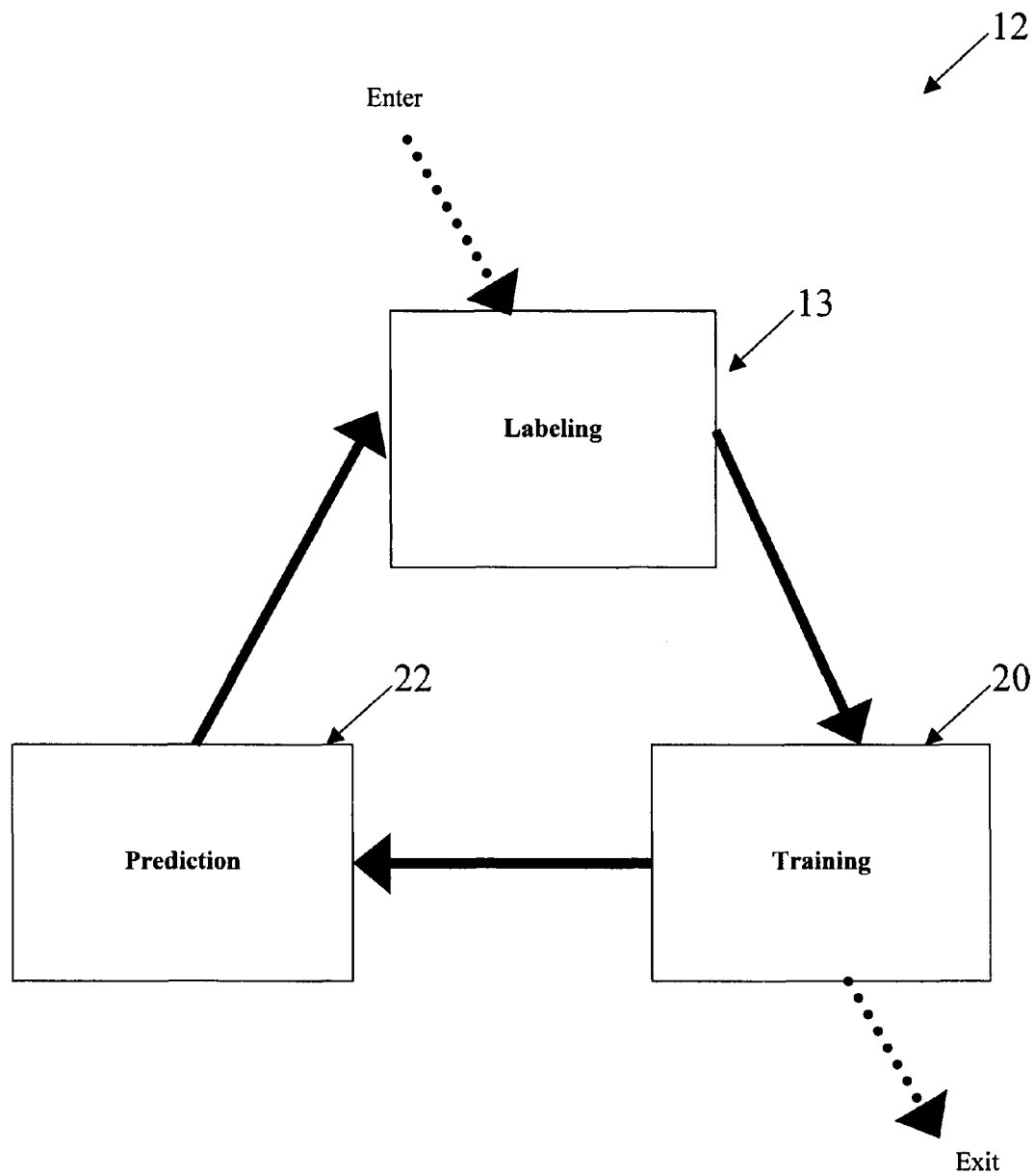
FIG. 2 is a detailed schematic representation of the training mode of the method of the subject invention.

Referring to FIG. 2, there is illustrated a detailed schematic representation of the training mode 12 of the method 10 of the subject invention. Initially, at step 18, upon receiving a definitional query from a user employing the system, a set of documents are retrieved in response to the query from a repository of structured documents, such as a web page, and the documents are labeled based upon particular glossary characteristics of the documents. The labeling may be expressed in a binary manner as "glossary" or "not glossary." If a document contains a sufficient amount of glossary characteristics, based on a pre-determined threshold, or if a document does not have any glossary characteristics, it is labeled as such with a prediction score, then archived and stored in a local database for retrieval.

At step 20, the stored documents are weighed by running the support vector regression learning algorithm based on the characteristics of the web pages that are labeled or have a very high or very low glossary prediction score. At step 22, all stored documents are re-predicted using the newly trained model for running support vector regression. The processes in Steps 18 through 22 reiterate as the system engages in active learning. Active learning is used to reduce the number of hand-labeled examples that must be supplied to train the system. See G. Schohn & D. Cohn, *Less is More: Active Learning with Support Vector Machines*, Proceedings of the 17th International Conference on Machine Learning ((Morgan Kaufmann Publishers, San Francisco, Calif., 2000); see also S. Tong & D. Keller, *Support Vector Machine Active*

*Learning with Applications*, Proceedings of the 17$^{th}$ International Conference on Machine Learning (Morgan Kaufmann Publishers, San Francisco, Calif., 2000).

Figure 3:
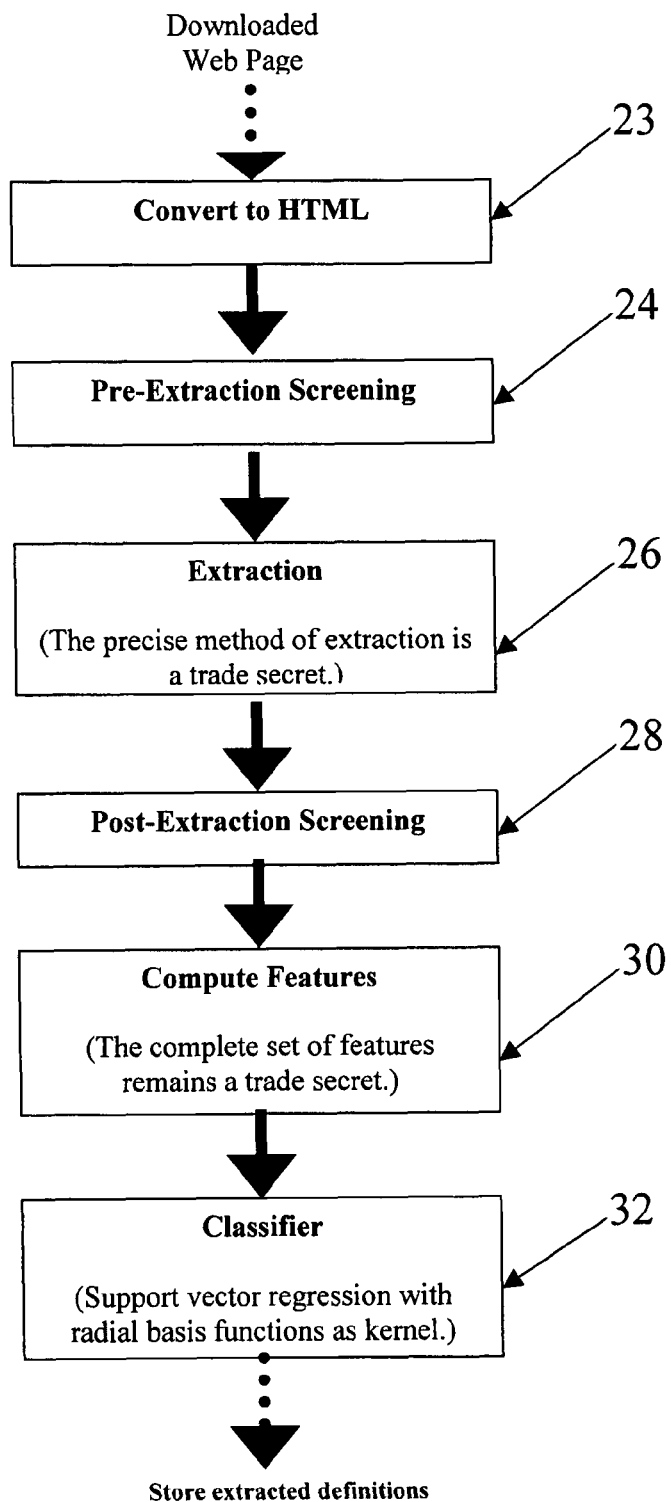
FIG. 3 is a detailed schematic representation of the prediction mode of the method of the subject invention.

Referring to FIG. 3, in the prediction mode 14 of the method 10 of the subject invention, initially, documents in postscript (.ps) or portable document format (.pdf) are converted into hypertext markup language (HTML) at step 23. At step 24, a pre-screening process may take place, where documents are analyzed according to set criteria, including, for example, whether there is an insufficient proportion of English words or whether the HTML is too complex. At step 26, definitions are extracted according to the results of the analysis.

At step 26, the system also identifies and extracts acronyms and their corresponding definition (or expansion). Acronyms and initializations appearing in documents are often defined within parentheses. For example, the initialization "NIH" is defined as "National Institute of Health" on the website located at http://www.nih.gov. To define the acronym or initialization, all text within parentheses is compared to the first letters of the preceding words. The first letters of trivial words, like "of," "the," and "a," are not required to appear in the following parentheses, although they may. The system also identifies and extracts definitions with the format: An "x" is a "y" because term "x" is often defined by "y."

In order to determine whether potentially legitimate definitions were extracted at step 26, these documents may be further screened based on supplementary criteria, including, for example: (i) whether there are no extracted definitions; (ii) whether there are too many extracted definitions; and (iii) whether there are unacceptably short terms definitions extracted. Additional or alternative screening criteria can be employed, at step 28.

At step 30, the presence, or absence, of features in the extracted definitions commonly, or rarely, found in glossaries are identified by the system. The system checks, for example, uniform resource links (URLs) for keywords, and links on web pages for pre-determined glossary features located in the appropriate section of the document based on set criteria. Glossary features include, for example, the presence of the term "glossary," or a variation thereof, or the presence of words that frequently begin definitions, such as "one" or "a." At step 32, extracted definitions are classified by numeric representations, which are the values of the features. The classified definitions are then weighed by running the trained support vector regression algorithm, or classifier, and the definitions are scored and saved in the local database if the prediction exceeds a predefined value.

Figure 4:
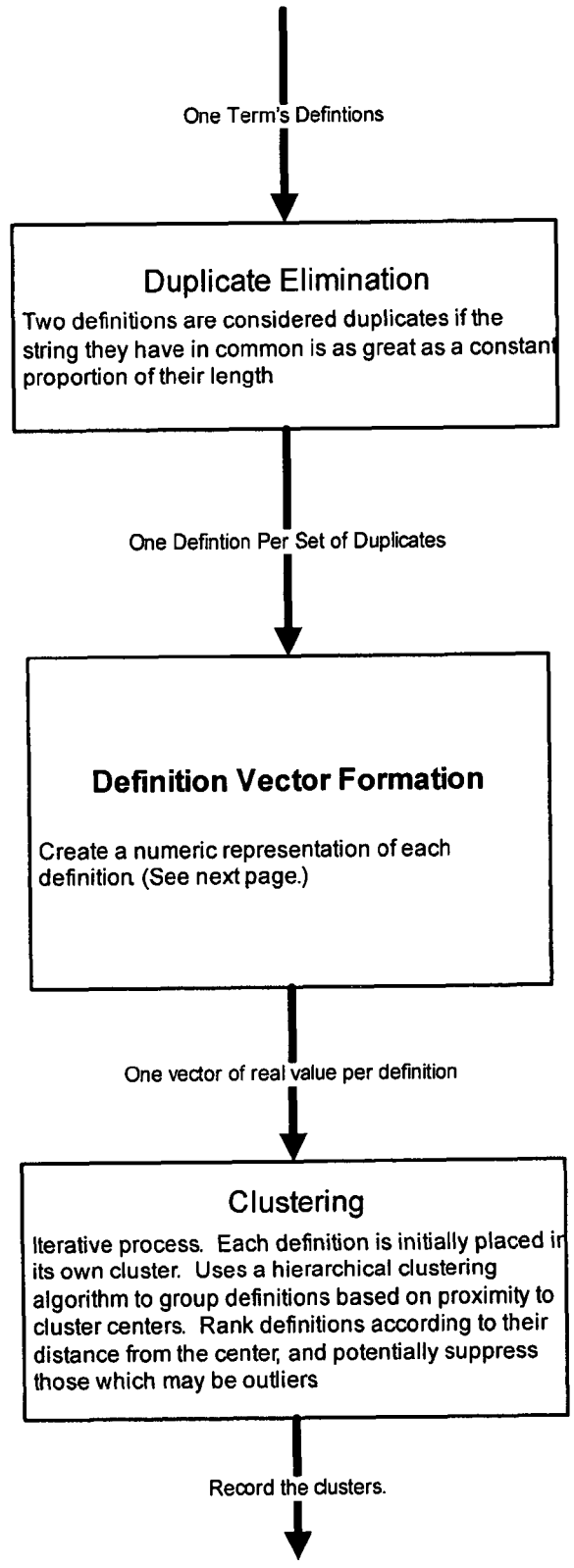
FIG. 4 is a detailed schematic representation of the optional grouping mode of the method of the subject invention.

Referring now to FIG. 4, in the optional grouping mode 16 of the method 10 of the subject invention, at step 34, duplicate definitions are eliminated. Definitions are considered duplicates if the text that they have in common is as great as a predefined proportion of their lengths. A vector for each definition is computed at step 36. At step 38, the definitions are clustered based on the relative proximity of their vectors and ranked according to their vectors distances' from the centroid of their cluster. The outliers are then removed. Then, the clusters are recorded and in a particular embodiment, they can be displayed through a user interface.

Figure 5:
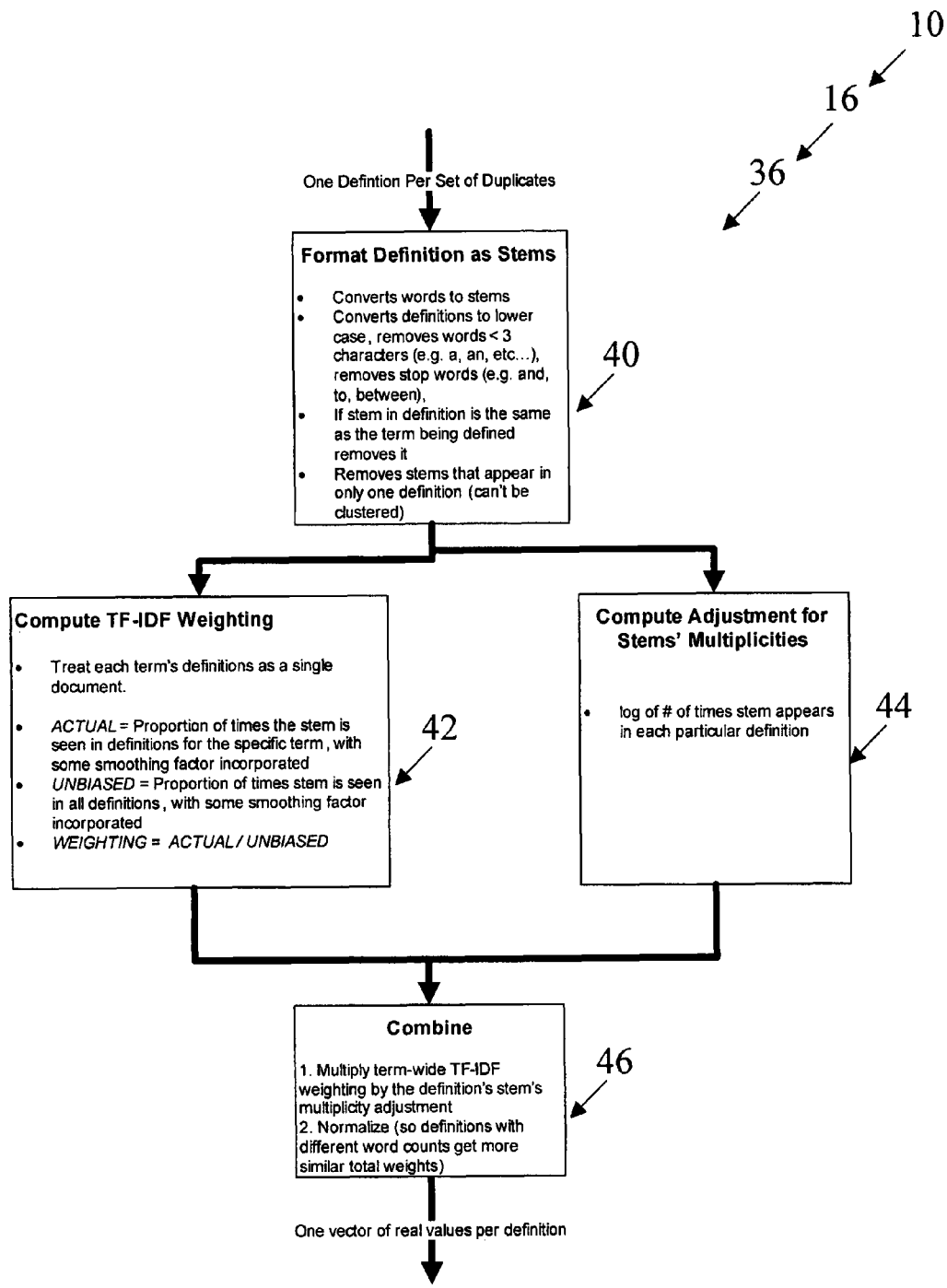
FIG. 5 is a detailed schematic representation of the definition vector formation process associated with the optional grouping mode of the method of the subject invention.

Referring to FIG. 5, there is illustrated a detailed schematic representation of the definition vector formation process performed at step 36 of optional grouping mode 16 of the method 10 of the subject invention. At step 40 of the vector formation, the text in the definitions is formatted. First, the text is converted into stems. Each term has a stem, and a stem is a portion of that term shared by all tenses of the term, e.g. "plant" is the stem of "plants." Next, the text in the definition is converted into lower case; the text in the definitions with less than a predefined number is removed; the text in the definitions containing stop words, e.g. "and," "to," and "between", is disregarded; stems that are equivalent to the query are removed because occurrence in multiple definitions is not indicative of shared semantic meaning; and stems that appear in only one definition are removed, as they do not assist in clustering.

Referring once again to FIG. 5, to determine stem weight, the system compares: (i) the number of times each stem appears in the local database with (ii) the total number of stems in the database at step 42.

Commonality between definitions is established by comparing the individual words that compose them. Equality of a pair of words' stems is the specific type of comparison operation. Shared stems are those found in multiple definitions during comparison. Shared stems have different degrees of importance in determining similarity of definitions. Determining the weights of shared stems is a key towards determining commonality of semantic meaning among definitions.

Term Frequency Inverse Document Frequency ("TF-IDF") is an algorithm for weighting stems prior to clustering. TF-IDF refers to the stem's frequency in the document with respect to the frequency of the stem in all documents. Applying TF-IDF requires defining the set of documents upon which TF-IDF operates. Typically this set of documents is the same as the set to be clustered subsequently. Since the aim of this invention is to cluster each term's definitions into groups with common semantic meanings, each definition is treated as a document for the purposes of clustering. However, treating the definitions for each term as the set of documents for the purposes of weighting by TF-IDF would lead to poor results; most definitions are so short that the frequency of any given stem is not indicative of the importance of that stem.

Instead, all definitions of a particular term are treated as composing a single document, making the set of documents the set of all terms' definitions, or simply all definitions. This makes use of the observation that many of a term's definitions describe the same semantic meaning of the term. Thus, terms appearing in multiple definitions are likely to be important.

Once the TF-IDF weight is computed for the shared stems used in the definitions of a particular term, a new set of weights is generated for the stems in each definition of the term. These weights are computed by multiplying each stem's TF-IDF weight by the log of the number of times that the stem appears in the particular definition. The process is repeated for each definition. Thus, an intermediate step towards computing weights for use in clustering is computing all stems' weights according to TF-IDF. These TF-IDF weights are tailored to each stem in each definition, for use in clustering. In this manner, we overcome the limitation of short definitions that would be encountered if TF-IDF were applied directly to the set of a term's definitions. By tailoring the term's TF-IDF weighting to each definition, the multiplicity of each stem is factored within each definition, thus giving greater importance to the common use of a stem among different definitions.

In practice, the set of definitions on which to compute these frequencies is not infinitely large, and in some cases is quite small. This creates problems on stems that appear rarely in all definitions, because the denominator will end up being extremely low, thus providing so much weight to a single stem that it overshadows the weight of all others. For example, some exceedingly rare stems are misspellings, rather than words that are genuinely rare, yet intended. Adding a fixed constant to both the numerator and the denominator of a proportion disproportionately lowers extremely rare stems' weight, and thus dampens their influence during clustering. The calculation of stem weight may be expressed in the following manner:

Let $t_s$ be the number of a particular term's definitions in which stem s appears;
Let $|T|$ be the total number of a particular term's definitions;
Let $d_s$ be the number definitions for all terms in which stem s appears;
Let $|D|$ be the total number of definitions for all terms; and
Let $C_t$ and $C_d$ be constants used for smoothing;

Then the weight of any particular stem used to define a particular term is given by the following expression:

$$\frac{(t_s + c_t)/(|T| + c_t)}{(d_s + c_d)/(|D| + c_d)}$$

Figure 6:
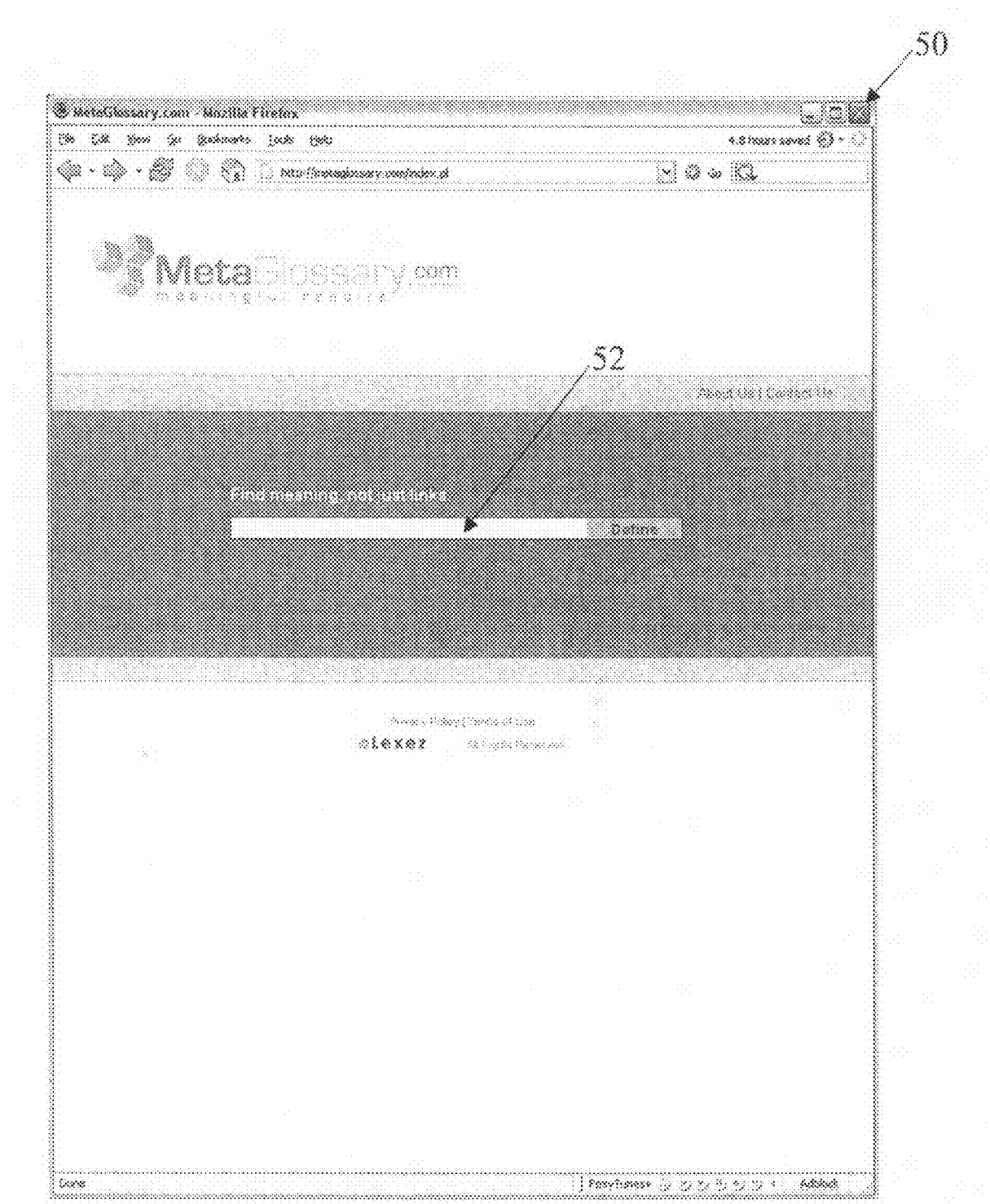
FIG. 6 is an exemplary web page illustrating the user interface of the subject invention, which operates in the optional output mode and includes a search box for entering definitional terms or phrases for retrieval in accordance with the method of the subject invention.

Referring now to FIGS. 6 through 9, there are illustrated several web pages depicting the graphical user interface employed with the system of the subject invention. As best seen in FIG. 6, the interface 50 presents the user with a search box 52 for entering a search terms or phrases. Turning to FIG. 6, by way of example, the search term "tick" is entered in search box 52. Through employment of the method 10 of the subject invention, the user is provided with a web page 54 populated with definitions for the term "tick" which were found on web pages throughout the repository of documents, in this instance, the Internet.

Figure 7:
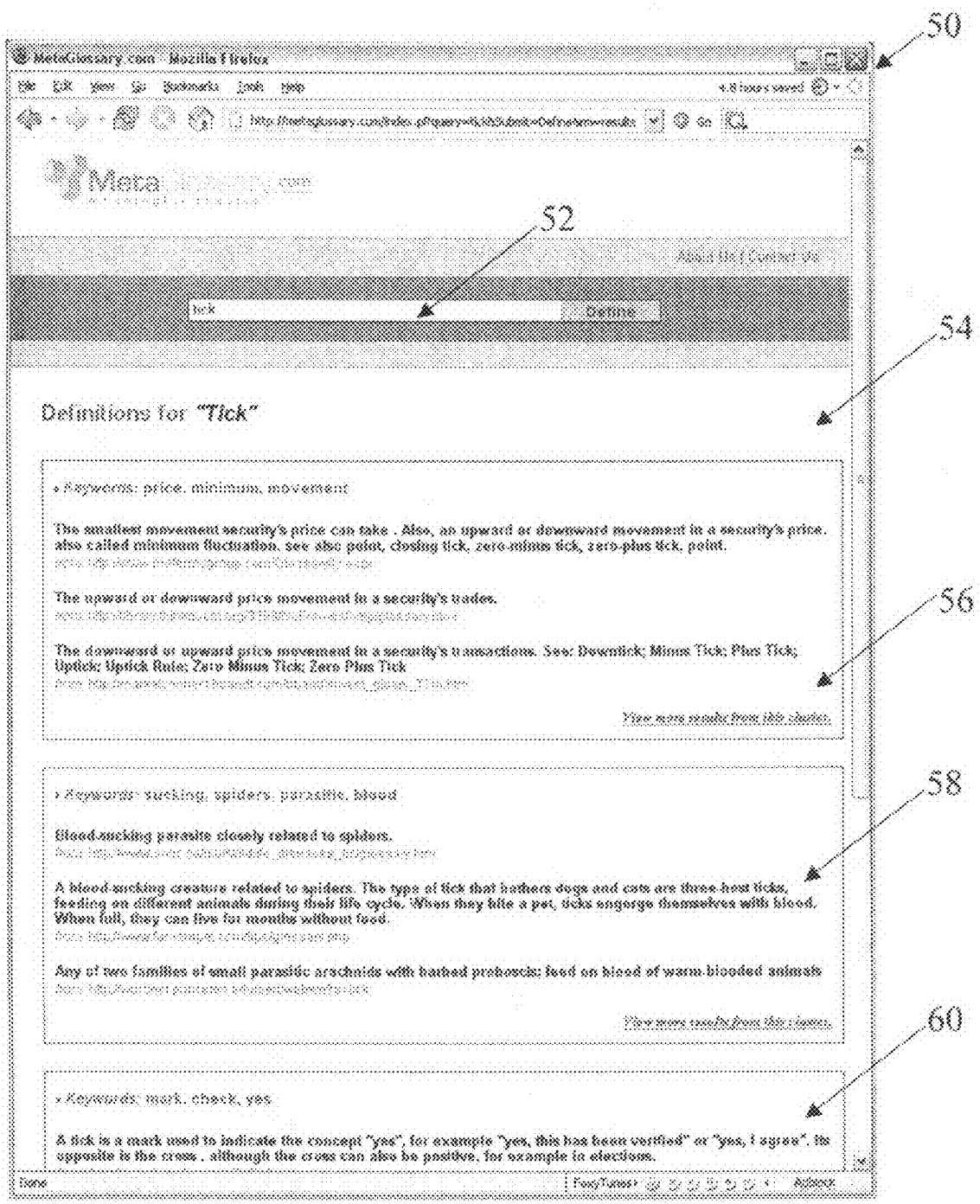
FIG. 7 is an exemplary web page illustrating a screen populated with definitions for the term "tick" found on the web, wherein definitions with common semantic meaning are grouped together by implementing the method of the subject invention.
Figure 8:
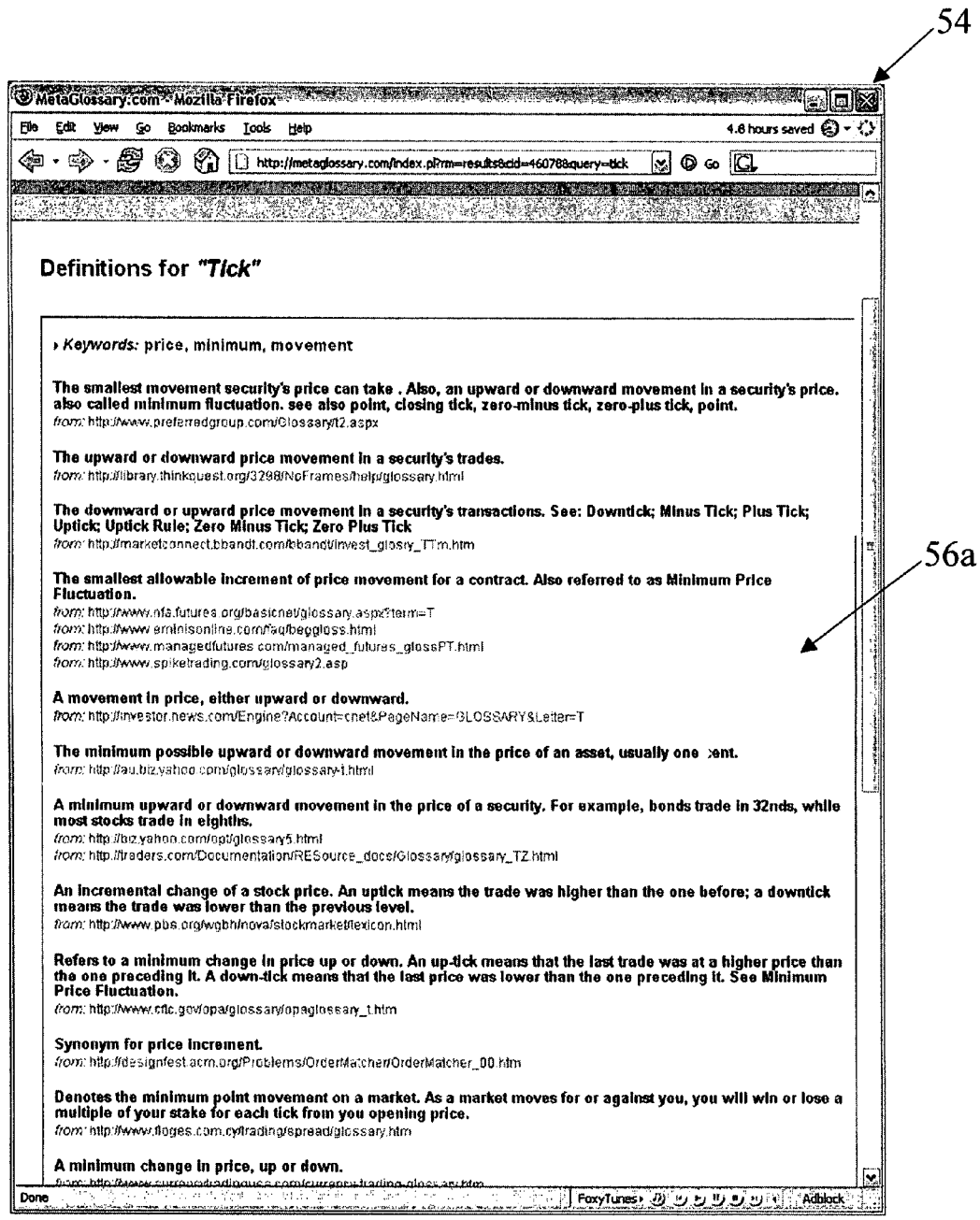
FIG. 8 is a web page showing an expanded group of definitions shown in FIG. 7.
Figure 9:
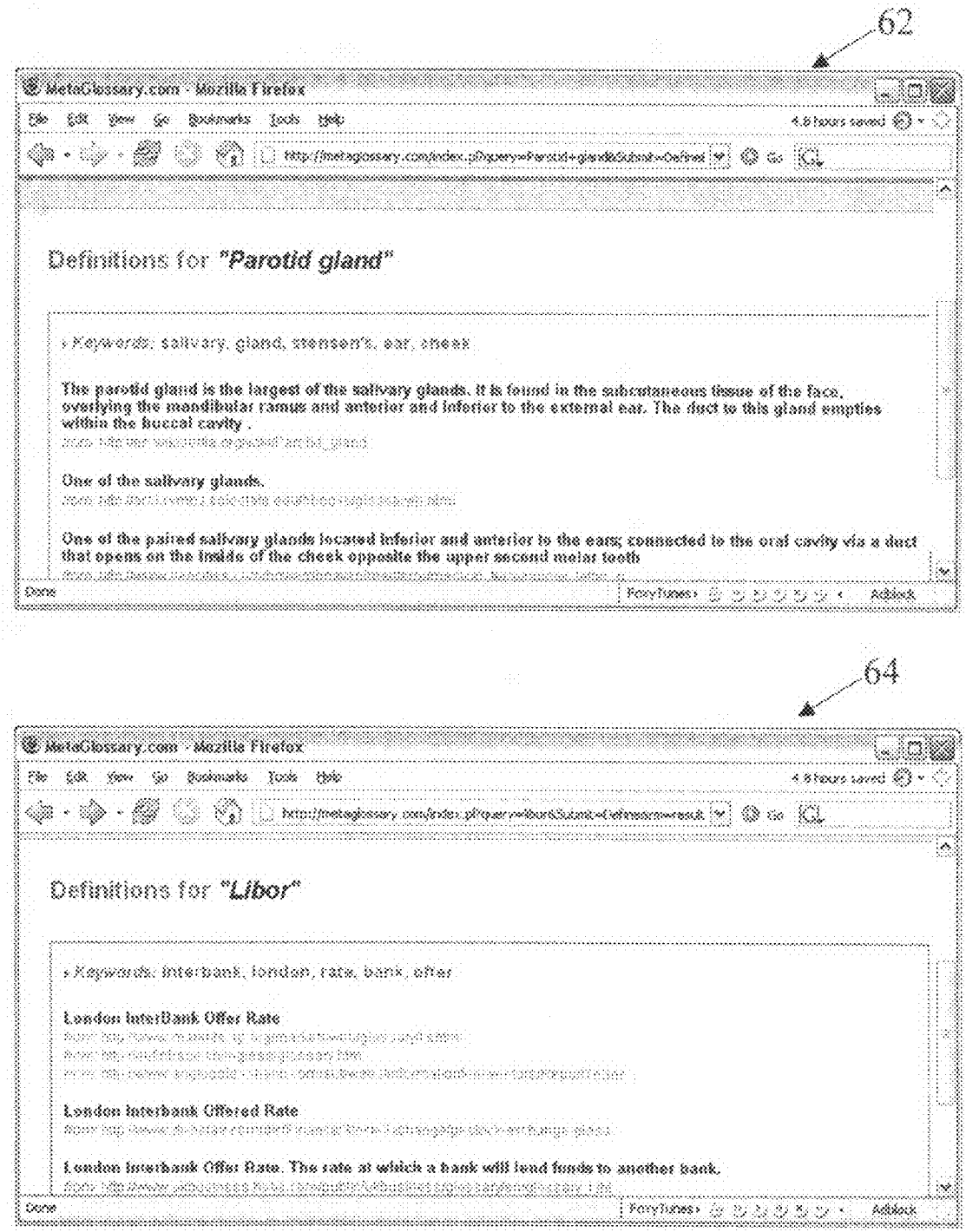
FIG. 9 is an illustration of two additional exemplary web pages illustrating screens populated with definitions for the terms "parotid gland" and "LIBOR" found on the web, including domain-specific definitions that would not be found in an English dictionary.

As shown in FIG. 7, definitions with common semantic meaning are grouped together by the system 10, in an intelligent manner, without human assistance. For example, financial-type definitions are grouped together in web page 56, insect-related definitions are grouped together in web page 58, and mark type definitions are grouped together in web page 60. As shown in FIG. 8, a particular group of definitions presented to the user can be expanded in an enlarged web page 56a. As shown in FIG. 9, because the system of the subject invention is adapted and configured to search data repositories for content, many domain specific definitions are included in the presentations to the user, which would not be found in a typical English dictionary. For example, web page 62 shows definitions for the scientific term "parotid gland" and web page 64 shows definitions for the financial acronym "LIBOR." These terms are not found in typical English dictionaries, but they are easily retrieved and intelligently grouped using the system and method of the subject invention.

Figure 10:
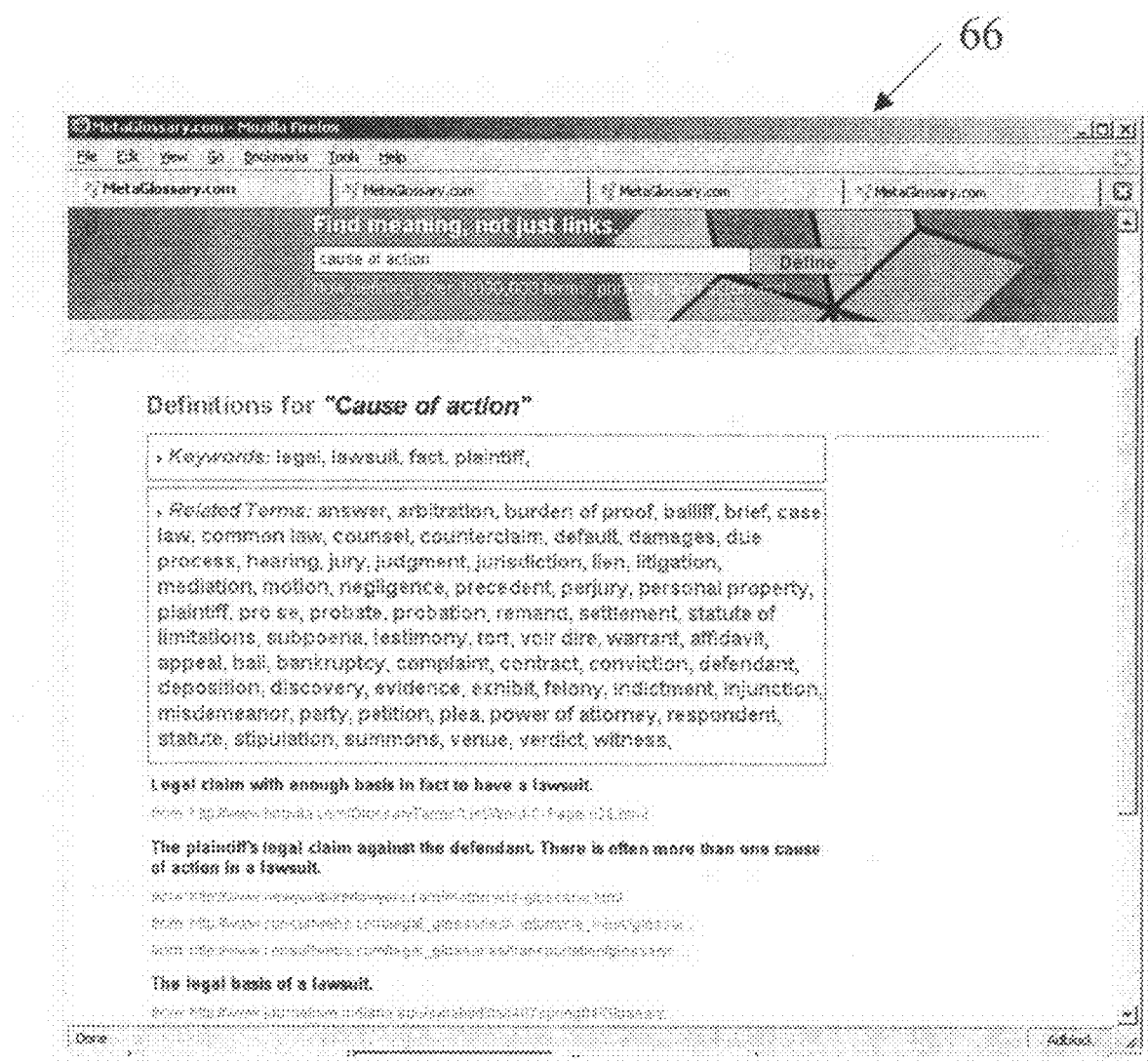
FIG. 10 is an exemplary web page illustrating the display of related terms along with definitions for the phrase "cause of action" found on the web.
Figure 11:
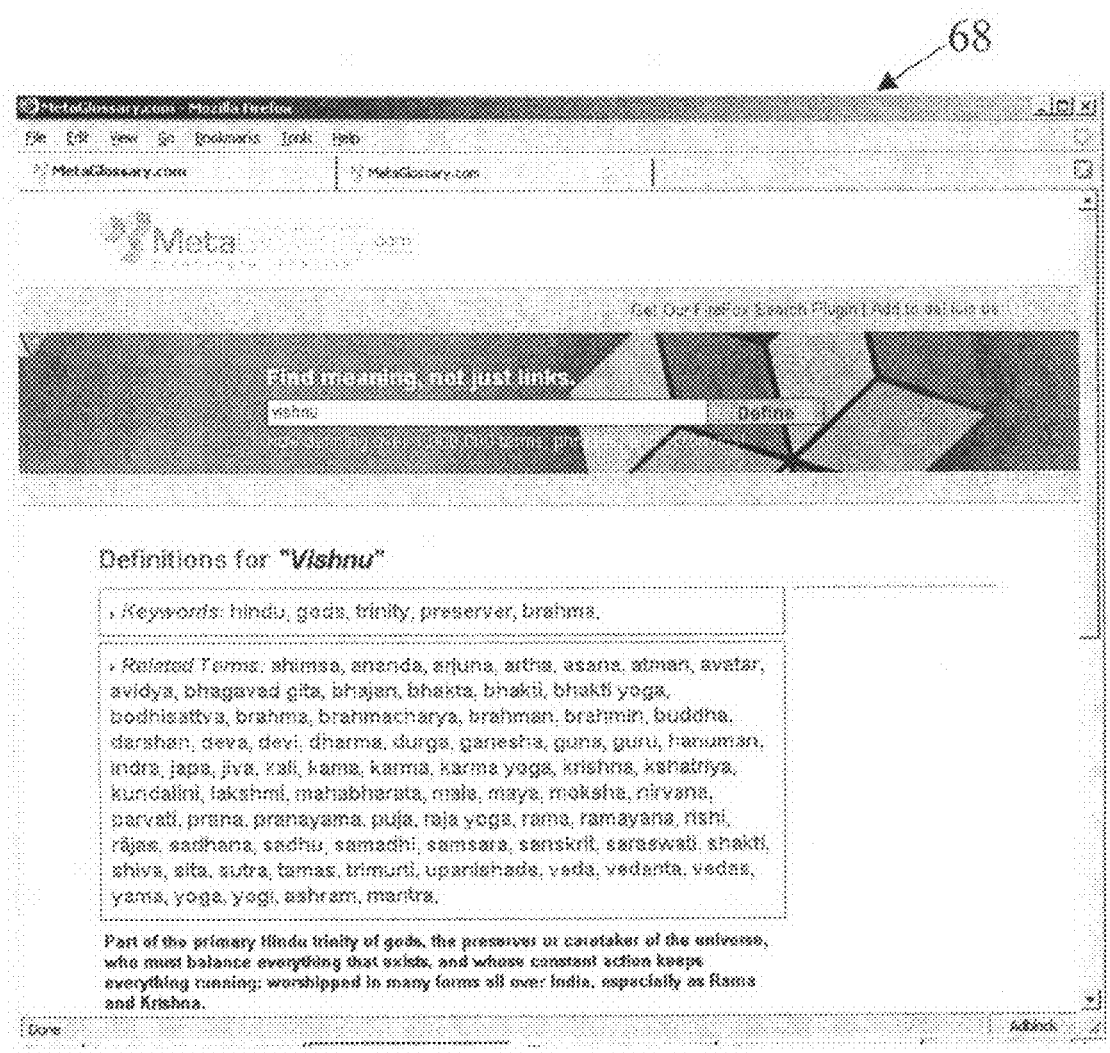
FIG. 11 is an exemplary web page illustrating the display of related terms along with the definitions displayed for the term "Vishnu" found on the web.

Referring now to FIGS. 10 through 13, there are illustrated several web pages depicting the display of related terms employed by the system of the subject invention. As seen in FIG. 10, the user is provided with a web page 66 displaying with related terms to the initial query for "cause of action." Through employment of the method 10, the system searches for the co-occurrence of terms in a glossary to suggest that certain terms are related. As further shown in FIG. 11, the user is presented with web page 68 showing related terms to the user's initial query for definition for the term "Vishnu."

To further illustrate, a glossary about "ecology" might define both "biodiversity" and "biomass." The frequency with which "biodiversity" and "biomass" co-occur in glossaries can be used as a measure of similarity among terms. Furthermore, even if two terms "a" and "b" are not defined on the same web page, they may still be marked as being similar if a third term "c" co-occurs on web pages separately with both "a" and "b." Similarity is also assigned with "a" and "b" if "a" co-occurs with "d," and "d" has non-zero similarity to "b." The algorithm to compute similarity can be run for numerous iterations.

Figure 12:
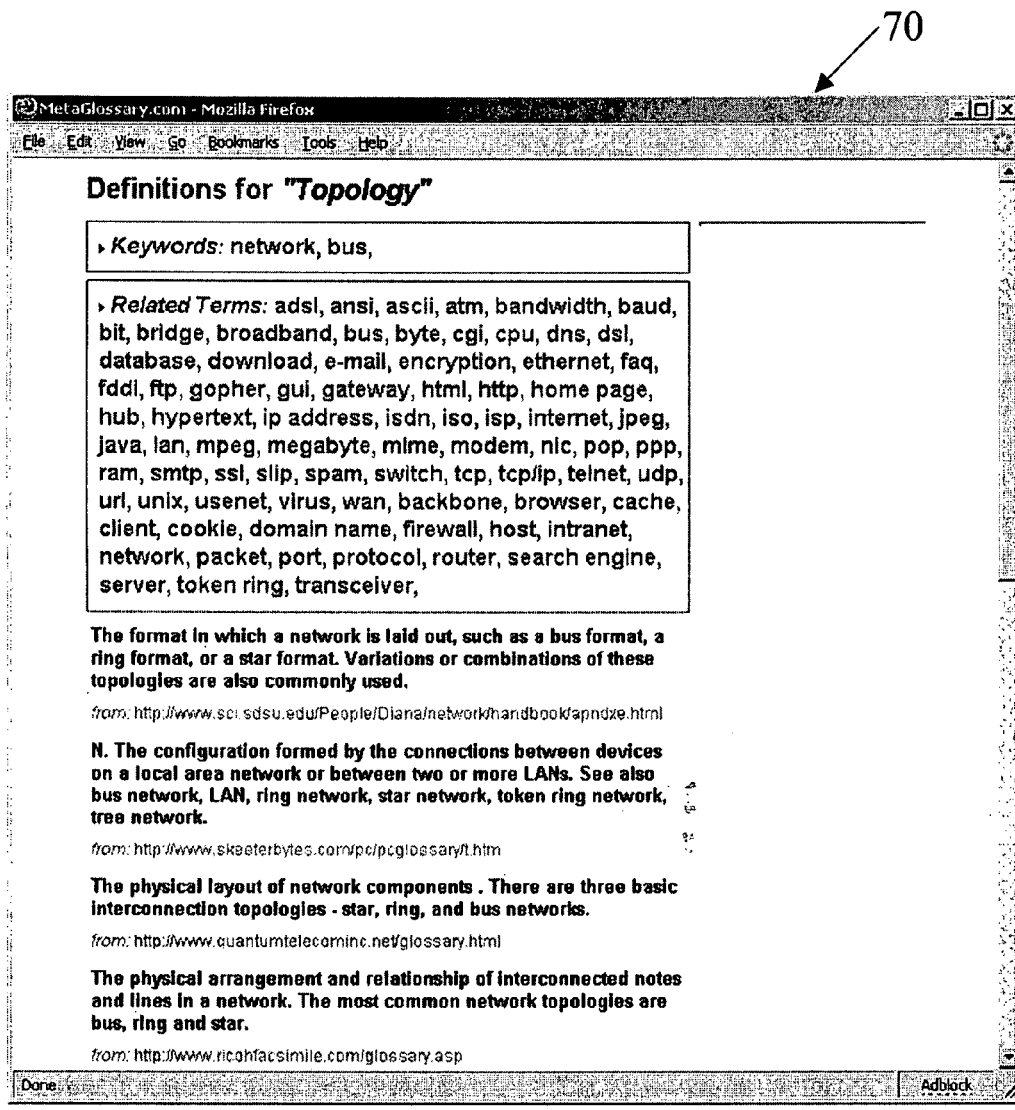
FIG. 12 is an exemplary web page illustrating the display of related terms according to the first set of grouped of definitions for the term "topology.
Figure 13:
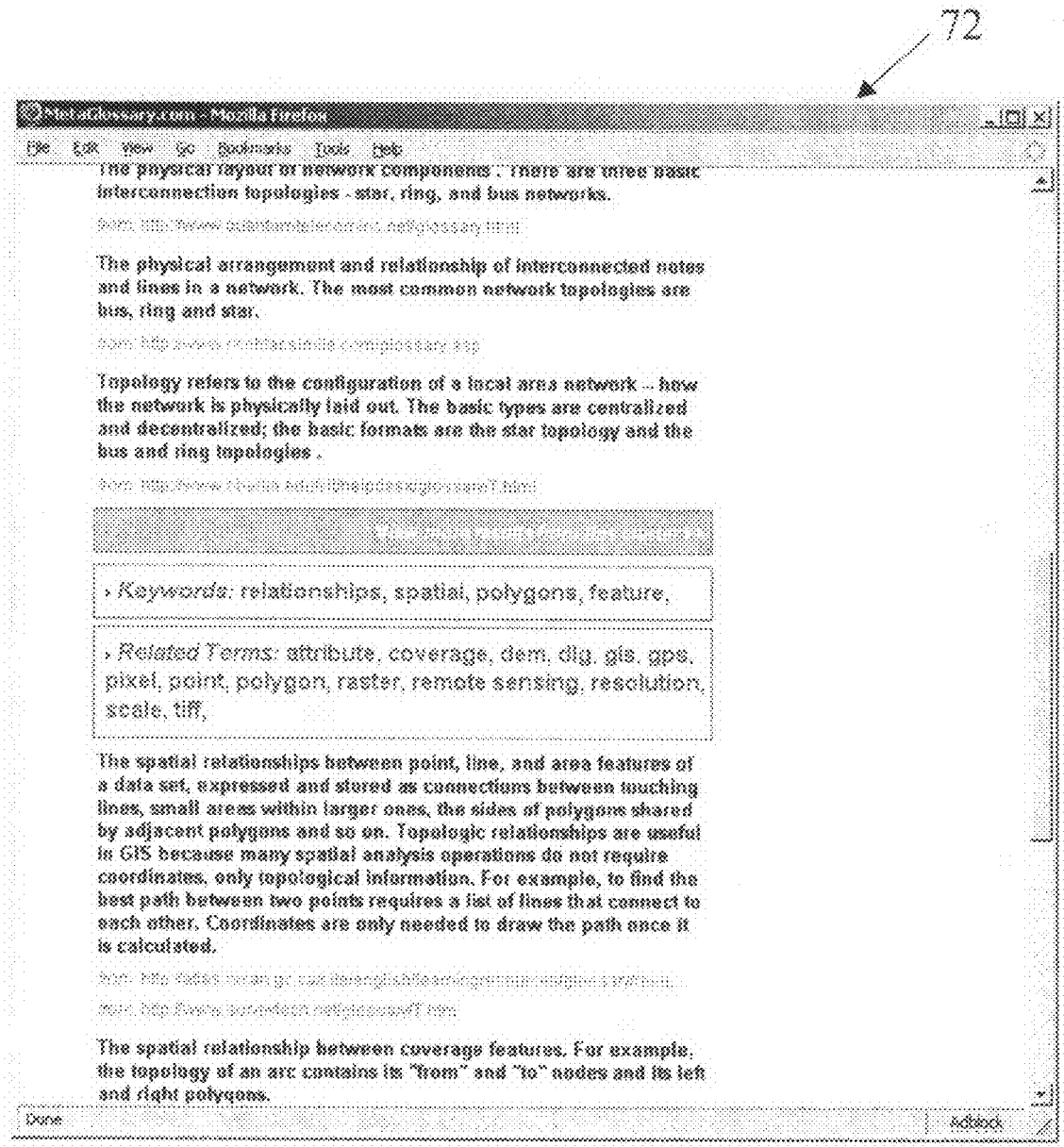
" and FIG. 13 is an exemplary web page illustrating the display of related terms according to the second set of grouped of definitions for the term "topology."

As shown in FIGS. 12 and 13, because terms may have multiple semantic meanings, the system computes the similarity of each semantic meaning for all other semantic meanings. Thus, the system finds the similarity between senses of terms, not the similarity between terms. The user is presented with web page 70 displaying related terms for one sense of the term "topology," and the user is presented with web page 72 displaying related terms for a different sense of the term "topology."

In searching for related terms, co-occurrence is computed on web pages according to the base URL, which is the portion of the URL up to the final forward slash. Because a single glossary may span multiple web pages, the system also detects glossaries that are duplicates, as multiple copies of the same glossary often appear on the Internet. Thus, terms in duplicate glossaries are not treated as having similarity.

Below is the exemplary function that computes a single iteration of the algorithm for computing related terms.

```
def relatedClusters(cluster):
    UBPs = clusterToUBP[cluster]
    maxPossibleRelated = len(UBPs)
    SMOOTHING = 10
    updateFactor = 1.0 / (SMOOTHING + maxPossibleRelated)
    curRelated = { }
    for oneUBP in UBPs.values( ):
        partitionRelated = { }
        for url in oneUBP:
            commonUrlClusters = urlToClusters[url];
            for relCluster in commonUrlClusters:
                if relCluster != cluster:
                    partitionRelated[relCluster] = 1 #count once
        for relCluster in partitionRelated.keys( ):
            curRelated[relCluster] = curRelated.get(relCluster, 0) + updateFactor
    return curRelated
```

While the system and method of subject invention has been shown and described with reference to preferred embodiments, those skilled in the art will readily appreciate that changes and/or modifications may be made thereto without departing from the spirit and scope of the subject invention.

What is claimed is:

1. A method for intelligently grouping definitions, the method comprising the steps of:
   a) extracting a set of definitions from a repository of documents by:
      i) determining which documents in a repository of documents contains a glossary;
      ii) extracting definitional information from documents containing a glossary;
      iii) determining whether the documents in the repository contain an acronym within a series of text;
      iv) extracting definitional information from the documents containing an acronym or an initialization;
      v) searching in the repository of documents for terms appearing in sentences with a format which is suggestive of definitional phrase; and
      vi) extracting definitional information from documents with terms appearing in sentences of the format "a X is a Y";
   b) grouping the extracted definitions according to common semantic meaning;
   c) identifying groups of definitions that are themselves semantically similar to other groups of definitions; and d) storing the groups of extracted definitions to create a knowledge-base for retrieval.

2. A method according to claim 1, wherein the step of extracting definitional information from documents containing a glossary includes the steps of:
   a) converting extracted documents into HTML;
   b) computing a real-valued feature to describe each converted document and a potential definition to be extracted from the converted document;
   c) screening each converted document based on a comparison of the real-valued features to a predefined threshold;
   d) training a machine learning classifier to identify a glossary based on an evaluation of the real-valued features;
   e) predicting whether a valid definitions have been extracted; and
   f) storing valid definitions in a local database.

3. A method according to claim 2, wherein the step of screening each converted document based on a comparison of the real-valued features to a predefined threshold includes the steps of:
   a) determining whether a sufficient proportion of English words are present in the converted documents based on a predetermined threshold;
   b) identifying whether the converted documents contain HTML which cannot be efficiently processed due to the complexity of the HTML based on a predetermined threshold;
   c) assessing whether the converted documents contain definitions;
   d) checking whether the converted documents contain an excess of potential definitions according to a predetermined threshold; and
   e) determining whether the converted documents contain definitions that fail to meet a predetermined minimum length.

4. A method according to claim 2, wherein the step of training a machine learning classifier to identify a glossary based on an evaluation of the real-valued features includes the steps of:
   a) manually labeling each document according to whether or not only valid definitions were extracted from it;
   b) training a classifier to recognize documents with valid definitions;
   c) using the trained classifier to generate a prediction of whether documents that are not labeled contain valid definitions; and
   d) iteratively training the classifier using active learning.

5. A method according to claim 4, wherein the step of iteratively training the classifier using active learning includes the steps of:
   a) manually labeling documents with uncertain predictions;
   b) adding newly-labeled documents to a pool of previously-labeled documents; and
   c) retraining the classifier with the latest pool of labeled documents.

6. A method according to claim 1, further comprising the step of expanding acronyms found in retrieved documents.

7. A method according to claim 6, wherein the step of expanding acronyms found in retrieved documents includes the steps of:
   a) identifying parenthetical text;
   b) comparing the parenthetical text to the first letters of the preceding words for equivalents; and
   c) defining the parenthetical text with the preceding words, where the first letters of the preceding words are equivalent.

8. A method according to claim 1, wherein the step of grouping extracted definitions according to common semantic meaning includes the steps of:
   a) eliminating duplicate definitions;
   b) forming a vector representation of each definition;
   c) clustering definitions based on the vector representation;
   d) ranking each definition within the clustered definitions based on its distance from a centroid of the cluster; and
   e) suppressing definitions that are outliers, with respect to their distance from the centroid of the cluster.

9. A method according to claim 8, wherein the step of eliminating duplicate definitions includes the step of determining whether the longest common substring of two definitions exceeds a predefined proportion of the shorter definition's length.

10. A method according to claim 8, wherein the step of forming a vector representation of each definition includes the steps of:
    a) parsing each definition for a stem within the definition; and
    b) computing a weight for each stem.

11. A method according to claim 10, wherein the step of parsing definitions includes the steps of:
    a) transforming terms in definitions into stems;
    b) converting stems into lower case characters; and
    c) discarding converted stems based on a set of rules.

12. A method according to claim 11, wherein discarding converted stems based on a set of rules further includes the steps of:
    a) discarding converted stems with less than three characters;
    b) discarding converted stems consisting of stop words;
    c) discarding converted stems equivalent to the definitional query; and
    d) discarding converted stems that appear in only one definition.

13. A method according to claim 10, wherein the step of computing a weight for each stem includes the steps of:
    a) weighting each stem appearing in any definition of a particular term using a term frequency-inverse document frequency (TF-IDF) weighting;
    b) measuring the importance of each stem within a particular definition by calculating the number of times that the stem appears within the particular definition; and
    c) multiplying term-wide weighting of a stem by the measure of the stem's importance to determine a value for inclusion in the definition's vector representation.

14. A method according to claim 13, wherein the step of weighting each stem appearing in any definition of a particular term using a term frequency inverse document frequency (TF-IDF) weighting includes the steps of:
    a) calculating a first proportion based on the number of times a stem appears in a particular term's definition;
    b) calculating a second proportion based on the number of times a stem appears in definitions for all terms; and
    c) dividing the first and second proportions to yield the weight of the stem.

15. A method according to claim 1, wherein the step of grouping the extracted definitions according to common semantic meaning is repeated for each term's definitions.

16. A method according to claim 1, wherein the step of identifying groups of definitions that are themselves semantically similar includes the steps of:
    a) identifying co-occurrences of a terms defined in the same document; and
    b) computing a similarity metric to identify related clusters of definitions.

17. A method according to claim 1, wherein the step of extracting a set of definitions from a repository of documents includes the steps of:
   a) receiving a definitional query from a user;
   b) processing the definitional query; and
   c) providing a response to the definitional query without human assistance.

18. A system for intelligently grouping definitions, the system comprising:
   a) means for extracting a set of definitions from a repository of documents, including
      i) means for determining which documents in a repository of documents contains a glossary;
      ii) means for extracting definitional information from documents containing a glossary;
      iii) means for determining whether the documents in the repository contain an acronym within a series of text;
      iv) means for extracting definitional information from the documents containing an acronym or an initialization;
      v) means for searching in the repository of documents for terms appearing in sentences with a format which is suggestive of definitional phrase; and
      vi) means for extracting definitional information from documents with terms appearing in sentences of the format "a X is a Y";
   b) means for grouping the extracted definitions according to common semantic meaning;
   c) means for identifying groups of definitions that are themselves semantically similar to other groups of definitions; and
   d) means for storing the groups of extracted definitions to create a knowledge-base for retrieval.

19. A system according to claim 18, wherein the means for extracting definitional information from documents containing a glossary further includes:
   a) means for converting extracted documents into HTML;
   b) means for computing a real-valued feature to describe each converted document and a potential definition to be extracted from the converted document;
   c) means for screening each converted document based on a comparison of the real-valued features to a predefined threshold;
   d) means for training a machine learning classifier to identify a glossary based on an evaluation of the real-valued features;
   e) means for predicting whether a valid definitions have been extracted; and
   f) means for storing valid definitions in a local database.

20. A system according to claim 19, wherein the means for screening each converted document based on a comparison of the real-valued features to a predefined threshold further includes:
   a) means for determining whether a sufficient proportion of English words are present in the converted documents based on a predetermined threshold;
   b) means for identifying whether the converted documents contain HTML which cannot be efficiently processed due to the complexity of the HTML based on a predetermined threshold;
   c) means for assessing whether the converted documents contain definitions;
   d) means for checking whether the converted documents contain an excess of potential definitions according to a predetermined threshold; and
   e) means for determining whether the converted documents contain definitions that fail to meet a predetermined minimum length.

21. A system according to claim 19, wherein the means for training a machine learning classifier to identify a glossary based on an evaluation of the real-valued features further includes:
   a) means for manually labeling each document according to whether or not only valid definitions were extracted from it;
   b) means for training a classifier to recognize documents with valid definitions;
   c) means for using the trained classifier to generate a prediction of whether documents that are not labeled contain valid definitions; and
   d) means for iteratively training the classifier using active learning.

22. A system according to claim 21, wherein means for iteratively training the classifier using active learning further includes:
   a) means for manually labeling documents with uncertain predictions;
   b) means for adding newly-labeled documents to a pool of previously-labeled documents; and
   c) means for retraining the classifier with the latest pool of labeled documents.

23. A system according to claim 18, further comprising the means for expanding acronyms found in retrieved documents.

24. A system according to claim 23, wherein the means for expanding acronyms found in retrieved documents further comprises:
   a) means for identifying parenthetical text;
   b) means for comparing the parenthetical text to the first letters of the preceding words for equivalents; and
   c) means for defining the parenthetical text with the preceding words, where the first letters of the preceding words are equivalent.

25. A system according to claim 18, wherein the means for grouping extracted definitions according to common semantic meaning further includes:
   a) means for eliminating duplicate definitions;
   b) means for forming a vector representation of each definition;
   c) means for clustering definitions based on the vector representation;
   d) means for ranking each definition within the clustered definitions based on its distance from a centroid of the cluster; and
   e) means for suppressing definitions that are outliers, with respect to their distance from the centroid of the cluster.

26. A system according to claim 25, wherein the means for eliminating duplicate definitions further includes a means for determining whether the longest common substring of two definitions exceeds a predefined proportion of the shorter definition's length.

27. A system according to claim 25, wherein the means for forming a vector representation of each definition further includes:
   a) means for parsing each definition for a stem within the definition; and
   b) means for computing a weight for each stem.

28. A system according to claim 27, wherein the means for parsing definitions further includes:
   a) means for transforming terms in definitions into stems;
   b) means for converting stems into lower case characters; and c) means for discarding converted stems based on a set of rules.

29. A system according to claim 28, wherein the means for discarding converted stems based on a set of rules further includes:
   a) means for discarding converted stems with less than three characters;
   b) means for discarding converted stems consisting of stop words;
   c) means for discarding converted stems equivalent to the definitional query; and
   d) means for discarding converted stems that appear in only one definition.

30. A system according to claim 27, wherein the means for computing a weight for each stem further includes:
   a) means for weighting each stem appearing in any definition of a particular term using a term frequency-inverse document frequency (TF-IDF) weighting;
   b) means for measuring the importance of each stem within a particular definition by calculating the number of times that the stem appears within the particular definition; and
   c) means for multiplying term-wide weighting of a stem by the measure of the stem's importance to determine a value for inclusion in the definition's vector representation.

31. A system according to claim 13, wherein the means for weighting each stem appearing in any definition of a particular term using a term frequency inverse document frequency (TF-IDF) weighting further includes:
   a) means for calculating a first proportion based on the number of times a stem appears in a particular term's definition;
   b) means for calculating a second proportion based on the number of times a stem appears in definitions for all terms; and
   b) means for dividing the first and second proportions to yield the weight of the stem.

32. A system according to claim 18, wherein the means for identifying groups of definitions that are themselves semantically similar includes:
   a) means for identifying co-occurrences of a terms defined in the same document; and
   b) means for computing a similarity metric to identify related clusters of definitions.

33. A system according to claim 18, wherein the means for extracting a set of definitions from a repository of documents further includes:
   a) means for receiving a definitional query from a user;
   b) means for processing the definitional query; and
   c) means for providing a response to the definitional query without human assistance.

\* \* \* \* \*